Terwilleger & Isdell.
Hay Loader.
Nº 94791  Patented Sept. 14, 1869

Witnesses
Alex F. Roberts
Wm F. Clark

Inventors
F. Terwilleger
J. B. Isdell
Per Munn & Co.

United States Patent Office.

FRANCIS TERWILLEGER AND JOHN R. ISDELL, OF WYANET, ILLINOIS.

Letters Patent No. 94,791, dated September 14, 1869.

IMPROVEMENT IN HAY-RAKERS AND LOADERS.

The Schedule referred to in these Letters Patent and making part of the same.

*To all whom it may concern:*

Be it known that we, FRANCIS TERWILLEGER and JOHN R. ISDELL, of Wyanet, in the county of Bureau, and State of Illinois, have invented a new and improved Combined Hay-Rake and Loader; and we do hereby declare that the following is a full, clear, and exact description thereof, which will enable others skilled in the art to make and use the same, reference being had to the accompanying drawing, forming part of this specification, in which—

Similar letters of reference indicate corresponding parts.

Our invention has for its object to furnish a machine, simple in construction and effective in operation, by means of which the hay may be collected and loaded upon the hay-rack as the wagon is drawn forward; and It consists in the construction and combination of the various parts of the machine, as hereinafter more fully described.

A is a large roller, the journals $a'$ of which revolve in bearings in the frame B.

Figure 2:
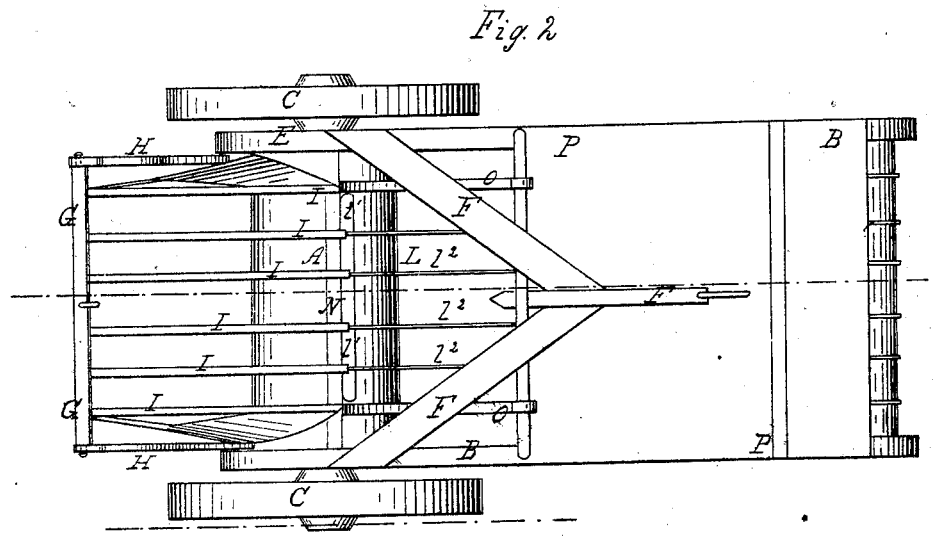
Figure 2 is an under side view of the same.
Figure 3:

Upon the projecting journals $a'$ are placed the wheels C, as shown in fig. 2.

The wheels C are kept in place upon the journals $a'$, and made to carry the said journals $a'$ and the roller A with them as they roll forward, by the pawls D attached to the outer ends of the journals $a'$, and which take hold of the concave ratchets E, formed in or attached to the outer ends of the hubs of the wheels C.

This construction allows the wheels C to be turned back, in backing or turning, without giving a backward movement to the machinery.

F is the reach-frame, the rear parts of which are attached to the rear part of the frame B, at such an angle that when the forward end of said reach is attached to the wagon, the forward part of the frame B may project above the wagon-rack, so as to deposit the hay upon said rack.

G is a frame, which is connected with the rear end of the frame B by the draught-irons H.

Figure 1:
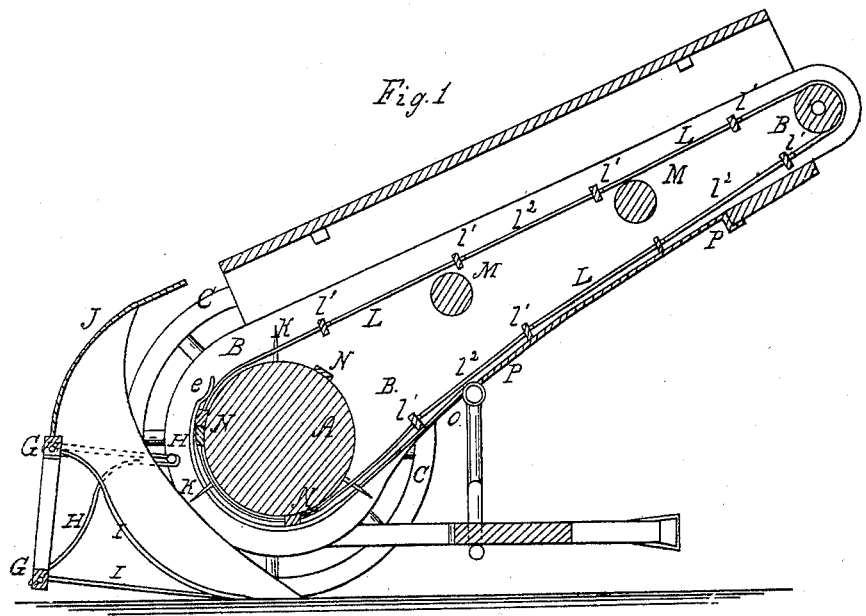
Figure 1 is a vertical longitudinal section of my improved machine, taken through the line $x\,x$, fig. 2.

I are the rake-teeth, which are made in about the form shown in fig. 1, and the ends of their lower or horizontal arms are attached to the lower cross-bar of the frame G. The ends of the upper arms of the teeth I, which are curved, as shown, are attached to the upper cross-bar of the frame G.

J is a hood, attached to the upper cross-bar of the frame G, and projecting upward and forward, as shown in fig. 1, so as to confine the hay as it passes up the curved teeth I, and guide it into such a position that it may be caught by the teeth K of the roller A, and carried up upon the carrier.

The sides of the hood J descend along the side teeth I, and their forward ends are attached to the forward ends of the said teeth.

L is the carrier, which is formed by attaching cross-strips, $l^1$, to the cords $l^2$, by passing the said cords through holes in the said strips, and securing them from slipping by knots, or other convenient means.

The carrier L passes around rollers, M, pivoted to the frame B, and is carried forward by longitudinal cleats, N, attached to the roller A, between the rows of teeth K, as shown in fig. 1.

The carrier L is held close up against the roller A, while passing around it, by the curved springs O, attached to the frame B, and which pass around the under and rear sides of the roller A, as shown in fig. 1.

The bottom P of the upper part of the frame B is made close, as shown in fig. 1, and its top or upper side is covered with a close cover, Q, which is made in two parts, and is hinged to the sides of the frame B, so that it may be conveniently opened, when desired, to obtain access to the carrier L.

This construction prevents the hay from being scattered and blown about by the wind while being raised or loaded upon the rack.

Having thus described our invention,

What we claim as new, and desire to secure by Letters Patent, is—

The combination of the springs O with the frame B, toothed roller A, and carrier L $l^1$ $l^2$, substantially as herein shown and described, and for the purpose set forth.

FRANCIS TERWILLEGER.
JOHN R. ISDELL.

Witnesses:
Z. K. WALDRON,
H. B. SMITH.